United States Patent [19]

Sextro et al.

[11] 4,046,738

[45] Sept. 6, 1977

[54] PROCESS FOR THE MANUFACTURE OF GRANULAR OXYMETHYLENE POLYMERS

[75] Inventors: Günter Sextro; Karlheinz Burg, both of Naurod, Taunus; Hans Joachim Leugering, Frankfurt am Main; Helmut Schlaf, Fischbach, Taunus; Alwin Heller, Erzhausen, all of Germany

[73] Assignee: Hoechst Aktiengesellschaft, Frankfurt am Main, Germany

[21] Appl. No.: 629,628

[22] Filed: Nov. 5, 1975

[30] Foreign Application Priority Data

| Nov. 7, 1974 | Germany | 2452737 |
|---|---|---|
| Feb. 4, 1975 | Germany | 2504482 |
| Mar. 7, 1975 | Germany | 2509924 |

[51] Int. Cl.$^2$ .............................................. C08G 2/28
[52] U.S. Cl. ................................................. 260/67 FP
[58] Field of Search ................................... 260/67 FP

[56] References Cited

U.S. PATENT DOCUMENTS

| 3,318,848 | 5/1967 | Clarke | 260/67 FP |
|---|---|---|---|
| 3,371,066 | 2/1968 | Grundmann et al. | 260/67 FP |
| 3,418,280 | 12/1968 | Orgen | 260/67 FP |
| 3,419,529 | 12/1968 | Chase et al. | 260/67 FP |
| 3,466,262 | 9/1969 | Barrell et al. | 260/67 FP |
| 3,505,292 | 4/1970 | Smith et al. | 260/67 FP |

*Primary Examiner*—Lucille M. Phynes
*Attorney, Agent, or Firm*—Curtis, Morris & Safford

[57] ABSTRACT

Oxymethylene polymers (POM) are obtained in granular form by cooling a POM solution or dispersion having a temperature above the sintering temperature of the POM in two stages to a temperature just below the said sintering temperature. The solvent or dispersion agent used is a mixture of methanol and water and the cooling agent is a methanol/water mixture which may contain POM suspended therein. The granular POM obtained is suitable as technical material for making shaped articles.

14 Claims, No Drawings

PROCESS FOR THE MANUFACTURE OF GRANULAR OXYMETHYLENE POLYMERS

This invention relates to a process for the manufacture of granular oxymethylene polymers.

It is known to prepare oxymethylene polymers (POM) by copolymerizing formaldehyde or cyclic oligomers of formaldehyde, especially 1,3,5-trioxane, with suitable comonomers, especially cyclic ethers or cyclic acetals (cf. U.S. Pat. Nos. 3,027,351 and 3,803,049). It is also known that granular oxymethylene polymers are obtained by introducing a solution of an oxymethylene polymer into a precipitation agent having a temperature just below the sintering temperature of the oxymethylene polymer (cf. U.S. Pat. No. 3,371,066).

The present invention provides a process for the manufacture of a granular oxymethylene polymer (POM) containing, besides oxymethylene units, from 0.1 to 20% by weight of oxyalkylene units having from 2 to 8 adjacent carbon atoms in the main chain by cooling a solution or fine dispersion of the POM and subsequently separating the precipitated POM, which comprises cooling in two stages a solution or dispersion of the POM in a methanol/water mixture having a temperature 5° to 65° C above the sintering temperature ($T_s$) of the POM, in the first stage the solution or dispersion being cooled to a temperature 0° to 10° C above $T_s$ and in the second stage 1° to 10° C below $T_s$, separating the granular POM obtained and drying it.

This invention also relates to the granular oxymethylene polymers prepared by the aforesaid process.

Oxymethylene polymers in the sense of the invention are poly(oxymethylenes) having in the main valence chain, besides the oxymethylene units, from 0.1 to 20 and preferably from 0.5 to 10% by weight of oxyalkylene units habing from 2 to 8 adjacent carbon atoms, preferably 2,3, or 4. Especially suitable are oxymethylene polymers containing 1 to 5% by weight of oxyalkylene units.

The oxymethylene polymers are prepared in known manner by polymerizing the monomers in bulk, in suspension or in solution in the presence of cationically active catalysts, for example at a temperature of from 0° to 100° C, preferably 50° to 90° C (cf. U.S. Patent 3,027,352). Suitable cationically active catalysts are (1) protonic acids, for example perchloric acid, (2) esters of protonic acids, preferably of perchloric acid with low molecular weight aliphatic alcohols, for example perchloric acid tert. butyl ester, (3) anhydrides of protonic acids, preferably mixed anhydrides of perchloric acid and a low molecular weight aliphatic carboxylic acid, for example acetyl perchlorate, (4) Lewis acids, preferably halides of boron, tin, titanium, phosphorus, arsenic and antimony, for example boron trifluoride, tin tetrachloride, titanium tetrachloride, phosphorus pentachloride, phosphorus pentafluoride, arsenic pentafluoride and antimony pentafluoride and (5) complex compounds or salt like compounds, preferably etherates or onium salts, of Lewis acids, for example boron trifluoride diethyl etherate, boron trifluoride-di-n-butyl etherate, triethyloxonium-tetrafluoroborate, trimethyloxoniumhexafluorophosphate, triphenylmethyl-hexafluoroarsenate, acetyltetrafluoroborate, acetylhexafluorophosphate and acetylhexafluoroarsenate.

The amount of catalyst used in the copolymerization depends primarily on its efficiency and is generally from 0.1 to 2,000, preferably from 0.2 to 500 ppm, calculated on the total quantity of the compounds to be polymerized. Very efficient catalysts such as boron trifluoride are advantageously used in an amount of from 10 to 150, preferably of from 20 to 100 ppm, calculated on the total quantity of the compounds to be polymerized. For complex compounds or salt-like compounds of these catalysts, the corresponding molar quantities should be used. Rather vigorous catalysts such as perchloric acid can be used in an amount of from 0.2 to 10, preferably of from 0.3 to 5 ppm.

It is generally advisable to use the catalysts in a diluted form. Gaseous catalysts can be diluted with an inert gas, for example, nitrogen and noble gases such as argon, whereas liquid or solid catalysts can be dissolved in an inert solvent. Suitable solvents are especially aliphatic or cycloaliphatic hydrocarbons and nitrated aliphatic or aromatic hydrocharbons. Examples are cyclohexane, methylene chloride, ethylene chloride, nitromethane and nitrobenzene. The weight ratio of catalyst to diluent is usually from 1:5 to 1:10,000, preferably of from 1:10 to 1:1C0. Very strongly acting catalysts are advantageously diluted in a proportion of from 1:5,000 to 1:20,000.

The polymerization is advantageously carried out in an inert gas atmosphers with the exclusion of moisture. Suitable inert gases are, for example, noble gases such as argon, and nitrogen.

Compounds capable of being copolymerized with trioxane are especially (a) cyclic ethers having 3, 4 or 5 ring members, preferably epoxides, (b) cyclic acetals, preferably formals, having from 5 to 11 and preferably 5, 6, 7 or 8 ring members, and c) linear polyacetals, preferably polyformals.

Especially suitable comonomers to be polymerized with trioxane are compounds of the formula

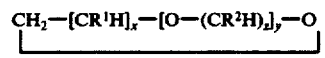

in which
A. each of $R^1$ and $R^2$, which may be identical or different, is a hydrogen atom, an aliphatic alkyl radical having from 1 to 6 carbon atoms, preferably 1, 2, 3 or 4, or a phenyl radical and
  a. $X$ is 1, 2, or 3 and $y$ is zero, or
  b $x$ is zero, $y$ is 1, 2 or 3 and $z$ is 2, or
  c. $x$ is zero, $y$ is 1 and $z$ is 3, 4, 5, or 6, or
B. $R^1$ is an alkoxymethyl radical having from 2 to 6 and preferably 2, 3 or 4 carbon atoms, or a phenoxymethyl radical, $x$ is 1 and $y$ is zero and $R^2$ has the meaning given above, Suitable cyclic ethers are, for example, ethylene oxide, propylene oxide, styrene oxide, cyclohexene oxide, oxide, oxacyclobutane and phenylglycidyl ether, and suitable cyclic formals are, for example, 1,3-dioxolane, 1,3-dioxane, 1,3-dioxepane, and 1,3,6-trioxocane, 4-methyl-1,3-dioxolane, 4-phenyl-1,3-dioxolane, 1,3-dioxonane and 1,3-dioxacycloheptene-(5). Suitable linear polyformals are especially poly(1,3-dioxolane) and poly(1,3-dioxepane).

For preparing oxymethylene polymers having a molecular weight in a specific range, it is advantageous to carry out the polymerization in the presence of a regulator. For this purpose there may be used especially formaldehyde dialkyl acetals having from 3 to 9, preferably 3, 4 or 5 carbon atoms, for example formaldehyde dimethylacetal, diethylacetal, dipropylacetal and dibutylacetal, and low molecular weight aliphatic alcohols, preferably alkanols having from 1 to 4 carbon atoms, such as methanol, ethanol, propanol, and butanol. The regulator is generally used in an amount up to 0.5% by weight, preferably from 0.005 to 0.1% by weight, calculated on the total amount of the monomers to be polymerized.

To remove unstable fractions the oxymethylene polymers are advantageously subjected to a thermal, controlled and partial degradation up to the primary terminal alcohol groups (cf. U.S. Pat. Nos. 3,174,948; 3,219,623; 3,666,714). The polymers are treated at a temperature of from 130° to 200° C, preferably 140° to 190° C, advantageously under non acid conditions in aqueous methanolic solution, suitably in the presence of a compound having a basic reaction, for example a low molecular weight tertiary aliphatic amine such as triethyl- or triethanol-amine, or a secondary alkali metal phosphate such as disodium hydrogenphosphate. A temperature of from 150° to 180° C proved to be especially suitable. Depending on the temperature, the thermal treatment is effected for 10 seconds to 2 hours, preferably 1 minute to 60 minutes. The higher the temperature the shorter the residence time. At 180° C about 1 to 2 minutes are sufficient, at 160° C the time is about 5 to 10 minutes, at 150° C about 10 to 30 minutes and at 140° C about 20 to 60 minutes. The thermal treatment is preferably carried out with substantial exclusion of oxygen.

As starting material in the process of the invention a solution or a fine dispersion of an oxymethylene polymer is used containing 3 to 35 and preferably 5 to 30% by weight of polymer. Very good results can be obtained with a polymer solution or dispersion containing 10 to 25% by weight of oxymethylene polymer.

The solvent or dispersion agent used is a mixture of 95 to 40% by weight of methanol and 5 to 60% by weight of water. Especially suitable is a mixture consisting of 95 to 70, preferably 92 to 80% by weight of methanol and 5 to 30, preferably 8 to 20% by weight of water. The methanol content of the mixture may also exceed 95% by weight and amount to 95.5 to 99.9 and preferably 96 to 99% by weight. The methanol water mixture may contain the compound having a basic reaction in an amount of from 50 to 10,000, preferably 100 to 1,000 ppm, calculated on the methanol/water mixture. The solution or dispersion has a temperature of from 5 to 65 and preferably 10 to 60° C above the sintering temperature of the oxymethylene polymer, a temperature range from 25° to 55° C above the sintering temperature being particularly advantageous.

The sintering temperature $T_s$ is the temperature at which the solid polymer particles suspended in the methanol/water mixture become soft on their surface and stick to one another without melting completely. The sintering temperature depends on the composition and the molecular weight of the polymer and on the type of the solvent or dispersing medium. The sintering temperature of the oxymethylene polymers used in accordance with the invention is in the range of from 100 to 140 and preferably 125° to 135° C.

The characteristic feature of the invention is the cooling in two stages of the poly(oxymethylene) solution or dispersion, in the first stage the solution or dispersion being cooled to the sintering temperature or slightly thereabove and in the second stage to a temperature just below the sintering temperature. For cooling liquid media or cooling devices are used.

As liquid cooling and precipitating agent there is used a methanol/water mixture having a composition in the same range as the aforesaid solvent or dispersing agent or a suspension consisting of 1 to 25%, preferably 5 to 15% by weight of a precipitated oxymethylene polymer and 99 to 75% and preferably 95 to 85% by weight of a methanol/water mixture having a composition in the same range as the aforesaid solvent or dispersing agent. The liquid cooling medium is maintained at a temperature of at most 2 and preferably 2° to 10° C below the sintering temperature of the oxymethylene polymer, a temperature of from 2° to 5° C below the sintering temperature having proved to be especially advantageous.

The methanol to be used in the process of the invention may contain up to 30 and preferably up to 10% by weight of organic impurities soluble in methanol and normally formed as by-products in the synthesis of oxymethylene polymers, for example formaldehyde, cyclic oligomers of formaldehyde, methylal, glycol, glycol formal, glycol monomethyl ether, glycol dimethyl ether, and low molecular weight aliphatic alcohols, low molecular weight aliphatic esters and acetone.

When a liquid cooling medium is used, the solution or fine dispersion of the oxymethylene polymer is continuously introduced in dosed quantities into a partial amount of the cooling or precipitating agent being in turbulent flowing motion. The mixture obtained has a temperature in the range of from 0° to 10° and preferably 0° to 6° C above the sintering temperature of the oxymethylene polymer, a temperature of 1 to 4° C above sintering temperature being especially favorable. After an average residence time of 0.5 to 5 and preferably 1 to 3 seconds the mixture obtained is mixed with the remaining amount of the cooling agent being in turbulent flowing motion. The resulting mixture has a temperature of from 1 to 10 and preferably 1° to 5° C below the sintering temperature of the oxymethylene polymer, a temperature range of from 2° to 4° C below the sintering temperature having proved to be especially favorable.

To carry out the process of the invention in continuous manner the POM solution or dispersion can be mixed with a partial amount of the cooling agent in a tube whereupon the mixture obtained is blended with the remaining portion of the cooling agent in an autoclave. The suspension containing the granular oxymethylene polymer is removed from the autoclave in the same measure as the mixture of starting material and first portion of cooling agent is supplied. Optionally a partial current of the suspension discharged from the autoclave is recycled and used as first portion of cooling agent. In this case the concentration of the suspension should be adjusted, if necessary, to the desired concentration by adding a methanol/water mixture. Especially favorable results are obtained by recycling the cooling agent and removing the suspension containing the granular oxymethylene polymer in the same measure as starting material and, if necessary, additional methanol/water mixture are supplied. The process of the invention should be carried out preferably in the atmosphere of an inert gas, for example a noble gas or nitrogen. The partial pressure of the inert gas should be in the range of from 1 to 20 and preferably 2 to 10 bars. Depending on the temperature used in each special case, the total pressure is in the range of from 5 to 40 and preferably 8 to 30 bars.

The average residence time of the oxymethylene polymer in the liquid cooling and precipitating agent is from 1 minute to 12 hours, preferably 2 minutes to 5 hours.

The proportion by volume of polymer solution or dispersion to the amount of cooling agent, into which the said solution or dispersion is first introduced, generally is in the range of from 1:2 to 1:35, preferably 1:10 to 1:20. The proportion by volume of the first portion of cooling agent to the residual portion of cooling agent is in the range of from 1:2 to 1:50, preferably 1:3 to 1:10.

For cooling the solution or dispersion of the oxymethylene polymer there may also be used devices preferably such devices as allow of a turbulent flowing motion of the polymer solution or dispersion, for example a tube in which the temperature can be maintained constant. The use of a cooling device is especially suitable in the second cooling stage of the process of the invention. The average cooling time during which the solution or dispersion of the oxymethylene polymer is cooled by the cooling medium in the first stage to a temperature of from 0° to 10° C above the sintering temperature of the polymer is in the range of from 0.5 to 5 and preferably 1 to 3 seconds.

After cooling in two stages the granular oxymethylene polymer obtained by precipitation or agglomeration is separated by known methods, for example filtration, decantation or centrifugation. The separated oxymethylene polymer is then dried at a temperature of from 20° to 135° C, preferably 50° to 120° C, advantageously in an inert gas, for example a noble gas or nitrogen.

The oxymethylene polymers obtained by the process of the invention are macromolecular substances having a reduced specific viscosity (RSV) of from 0.3 to 2.0, preferably 0.5 to 1.5 dl/g, measured in a 0.5% by weight solution of the polymer in γ-butyrolactone, containing 2% by weight of diphenylamine as stabilizer, at a temperature of 140° C. Their crystallite melting points are in the range of from 140° to 180° C, they have a melt index MFI 190/2 to 0.1 to 50, preferably 1 to 30 g/10 minutes, measured according to DIN 53,735 at a temperature of 190° C under a load of 2.16 kg. The granular polymer contains preferably at most 15% by weight of particles having a diameter of at most 0.2 mm and at least 50% of the particles have a diameter of at least 0.4 mm (sieve analysis). In general, its apparent density is above 300, preferably from 350 to 550 g/l, measured with the polymer dried at 70° C under nitrogen and homogeneously mixed for 2 minutes in a laboratory fluid mixer at a speed of 3,000 revolutions per minute.

The oxymethylene polymers obtained by the process of the invention can be stabilized by homogeneously mixing them with stabilizers against the action of heat, oxygen and/or light. Homogenization is normally carried out in a commercial mixing device, for example an extruder, at a temperature above the melting point of the polymer and up to 250° C, preferably at a temperature of from 180° to 210° C. The stabilizers are used in a total amount of 0.1 to 10 and preferably 0.5 to 5% by weight, calculated on the total mixture.

Suitable stabilizers are especially bisphenol compounds, alkaline earth metal salts of carboxylic acids and guanidine compounds. The bisphenol compounds used are preferably esters of monobasic 4-hydroxyphenyl alkanoic acids substituted once or twice in the nucleus by an alkyl radical having 1 to 4 carbon atoms and having from 7 to 13 carbon atoms preferably 7, 8 or 9 carbon atoms, with aliphatic di-, tri- or tetrahydric alcohols having 2 to 6, preferably 2, 3, or 4 carbon atoms, for example esters of ω-(3-tert.butyl-4-hydroxyphenyl)-pentanoic acid, β-(3-methyl-5-tert.butyl-4-hydroxyphenyl)-propionic acid, (3,5-di-tert.butyl-4-hydroxyphenyl)-acetic acid, β-(3,5-di-tert.butyl-4-hydroxyphenyl)-propionic acid or (3,5-di-isopropyl-4-hydroxyphenyl)-acetic acid with ethylene glycol, 1,2-propanediol, 1,3-propanediol, 1,4-butanediol, 1,6-hexanedio, 1,1,1-trimethylolethane, or pentaerythritol.

Suitable alkaline earth metal salts of carboxylic acids are especially those of aliphatic, preferably hydroxyl groups containing, mono-, di- or tri-basic carboxylic acids having from 2 to 20, preferably 3 to 9 carbon atoms, for example the calcium or magnesium salts of stearic acid, ricinoleic acid, lactic acid, mandelic acid, malic acid, or citric acid.

The guanidine compounds which may be used have the formula

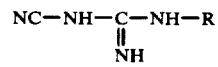

in which R is a hydrogen atom, a cyano group, or an alkyl radical having from 1 to 6 carbon atoms, for example cyanoguanidine, N-cyano-N'-methyl-guanidine, N-cyano-N'-ethyl-guanidine, N-cyano-N'-isopropyl-guanidine, N-cyano-N'-tert.butyl-guanidine, or N,N'-dicyano-guanidine, The guanidine compound is optionally used in an amount of from 0.01 to 1, preferably 0.1 to 0.5% by weight, calculated on the total mixture.

In addition, there may be added to the oxymethylene polymers prepared according to the invention known light stabilizers, for example derivatives of benzophenone, acetophenone and triazine. Further usual additives, such as dyestuffs, pigments, reinforcing agents, fillers and nucleating agents may also be added.

The oxymethylene polymers may be processed by all methods usually employed for thermoplastics, for example by injection molding, extrusion, blowing of extruded material, melt spinning and deep drawing. They are suitable for the manufacture of semi-finished and finished products such as shaped articles, for example bars, rods, plates, ribbons, bristles, threads, fibers, films, sheets, tubes and flexible tubes, as well as househould articles such as dishes and cups, and machine elements such as casings and gears. They are especially suitable for the manufacture of dimensionally stable and true to shape articles.

The following examples illustrate the invention, the parts and percentages being by weight unless otherwise stated.

EXAMPLES 1 to 11

Varying amounts of a copolymer of 98% trioxane and 2% ethylene oxide having a melt index i₂ (MFI 190/2) of 25 g/10 min. are blended with 100 parts of a methanol/water mixture containing 1,000 ppm triethylamine. The mixture obtained is heated for 5 minutes to 160° C to dissolve the polymer. Each minute 1 liter of the polymer solution is mixed with 10 liters of a suspension of 10 parts (in Example 1:7.5 parts) of a precipitated oxymethylene polymer in 90 parts (in Example 1:92.5 parts) of the aforesaid methanol/water mixture. The suspension having a temperature of 125° C flows through a tube at a speed of 2 m.s.$^{-1}$ while being in turbulent motion. Thus, with a sintering temperature of the polymer of 127° C the temperature of the cooling agent is 2° C below that sintering temperature. After 2 seconds, the resulting mixture having a temperature of 128° to 130° C is transferred to an autoclave by means of an immersion tube and mixed with 13 liters of a suspension being in turbulent flowing motion and having the specified composition and being maintained at a temperature of 125° C. Under these conditions the oxymethylene polymer precipitates completely. 10 Liters of the suspension obtained are discharged from the autoclave per minute through a conduit and mixed again with polymer solution. In Examples 3 to 6 the polymer concentration is adjusted to 10% by adding corresponding amounts of the above methanol/water mixture. The liquid level in the autoclave is kept constant by continuously discharging suspension in the same measure as polymer solution and optionally methanol/water mixture are supplied. During discharge the suspension is cooled to room temperature and the granular polymer is then separated from the liquid medium by centrifugation. The content of dry matter of the solid product is determined and the product is dried at 70° C under nitrogen. The apparent density and the particle diameter are determined with the dried product. Further particulars and the results are listed in the following Table 1.

10 Liters of the suspension obtained are discharged from the autoclave per minute and mixed with the above polymer solution. The polymer concentration of the suspension in the autoclave is kept approximately constant by adding 1.9 liters per minute of the methanol/water/triethylamine mixture. The liquid level in the autoclave is kept approximately constant by continuously discharging suspension in the same measure as the mixture of polymer solution and methanol/water/triethylamine mixture is added.

The discharged suspension is cooled to room temperature, the granular polymer us separated by centrifugation and dried under nitrogen at a temperature of 70° C. The centrifuged product has a content of dry matter of 50%. The dried polymer has an apparent density of 410 g/l. 77% of the polymer particles have a diameter above 0.4 mm and 4% have a diameter below 0.2 mm.

EXAMPLE 13

Example 12 is repeated with the following modifications: as solvent and cooling agent there is used a mixture of 97.5% methanol, 2.4% water and 0.1% triethylamine. The temperatures $T_1$, $T_2$ and $T_3$ are 132° C, 137° C and 132° C, respectively, and the sintering temperature of the polymer is 134° C. The content of dry matter is 54% and the polymer has an apparent density of 500 g/l. 84% of the polymer particles have a diameter above 0.4 mm and 5% have a diameter below 0.2 mm.

TABLE 1

| Example No. | solvent methanol/ water (wt. %) | polymer concentration (wt. %)* | dry matter (wt. %)** | apparent density (g/l) | particle size distribution (wt. %), diameter >0.4 mm | <0.2 mm |
|---|---|---|---|---|---|---|
| 1 | 85/15 | 7.5 | 46 | 330 | 73 | 7 |
| 2 | 85/15 | 10 | 44 | 370 | 85 | 7 |
| 3 | 85/15 | 15 | 46 | 360 | 88 | 4 |
| 4 | 85/15 | 20 | 50 | 350 | 88 | 5 |
| 5 | 85/15 | 25 | 48 | 370 | 92 | 4 |
| 6 | 85/15 | 30 | 53 | 400 | 90 | 2 |
| 7 | 85/15 | 10 | 44 | 350 | 60 | 15 |
| 8 | 85/15 | 10 | 46 | 370 | 95 | 1 |
| 9 | 80/20 | 10 | 46 | 360 | 83 | 4 |
| 10 | 50/50 | 10 | 42 | 330 | 76 | 9 |
| 11 | 45/55 | 10 | 44 | 340 | 87 | 6 |

*in the solution
**after centrifugation

EXAMPLE 12

25 Kg of a copolymer of 98% trioxane and 2% ethylene oxide having an RSV value of 0.65 dl/g, a crystallite melting point of 165° C and a melt index $i_2$ (MFI 190/2) of 25 g/10 min. are blended with 75 kg of a mixture of 95.5% methanol, 4.4% water and 0.1% triethylamine, and the polymer is dissolved by heating the mixture under nitrogen for 5 minutes at 185° C.

Each minute 1 liter of the solution obtained is mixed with 10 liters of a suspension of 10 kg of a precipitated oxyethylene polymer in 90 kg of the specified methanol/water/triethylamine mixture. The suspension having a temperature $T_1$ of 131° C flows through a tube at a speed of 2 m.s.$^{-1}$ while being in turbulent motion. With a sintering temperature of the polymer of 133° C the temperature of the cooling agent is thus 2° C below the said sintering temperature. After 2 seconds the resulting mixture having a temperature $T_2$ of 136° C is transferred to an autoclave by means of an immersion tube and mixed with 100 liters of a suspension having the above composition and being maintained in turbulent flowing motion at a temperature $T_3$ of 131° C.

EXAMPLE 14

25 Parts of a copolymer of 98% of trioxane abd 2% of ethylene oxide having an RSV value of 0.65 dl/g, a crystallite melting point of 165° C and a melt index $i_2$ (MFI 190/2) of 25 g/10 min. are mixed with 75 parts of a mixture of 85% methanol, 14.9% water and 0.1% triethylamine, and the polymer is dissolved by heating the mixture for 5 minutes at 160° C. Each minute 1 liter of the solution obtained is mixed with 3 liters of cooling agent (I), i.e. the above methanol/water mixture, having a temperature of 120° C and flowing through a tube at a speed of 2 m.sec$^{-1}$ while being in turbulent motion. With a sintering temperature of the polymer of 127° C the temperature of the cooling agent is 7° C below the said sintering temperature. After 2 seconds, the resulting mixture having a temperature of 130° to 132° C is introduced by means of an immersion tube into an autoclave containing 60 liters of cooling agent (II) consisting of a suspension of 5% of precipitated oxymethylene polymer and 95% of the above methanol/water mixture, which cooling agent is in turbulent motion and kept at a temperature of 125° C. The liquid volume in the autoclave is kept constant by continuously discharging suspension in the same measure as the mixture of solution and cooling agent is supplied.

The granular polymer is separated from the discharged suspension by centrifugation and dried at 70° C under nitrogen. The centrifuged product has a content of dry matter of 42%. 74% of the polymer particles have a diameter above 0.4 mm and 8% have a diameter below 0.2 mm. The dried polymer has an apparent density of 330 g/l.

EXAMPLES 15 to 19

Varying amounts of a copolymer of 98% trioxane and 2% ethylene oxide having a melt index $i_2$ (MFI 190/2) of 25 g/l are mixed with 100 parts of a methanol/water mixture containing 1,000 ppm triethylamine, and the polymer is dissolved by heating the mixture for 5 minutes to 160° C. 1 Liter of the solution is mixed per minute with 10 liters of a suspension of precipitated oxymethylene polymer in the methanol/water mixture; the suspension having a temperature of 125° C and flowing through a tube at a speed of 3 m.s.$^{-1}$ while being in turbulent motion. With a sintering temperature of the polymer of 127° C the temperature of the liquid cooling agent is 2° C below the sintering temperature. After 2 seconds, the resulting mixture having a temperature of 128+ to 130° C arrives in a tube section provided with a jacket with thermostat in which it is cooled to 125° C within 3 seconds while being in turbulent flowing motion. The mixture is then blended with 100 liters of a suspension having the aforesaid composition, which suspension is in turbulent motion in an autoclave and kept at 125° C.

Through a conduit 10 liters per minute of the suspension obtained are discharged from the autoclave and mixed again with the polymer solution. In Examples 16, 17, and 19 the polymer concentration in the suspension is adjusted to 10% by adding corresponding amounts of the methanol/water mixture. The level in the autoclave is kept constant by continuously discharging suspension in the same measure as polymer solution and methanol/water mixture, if any, are added. During discharge the suspension is cooled to room temperature, and the granular polymer is separated by centrifugation. The content of dry matter of the solid product is determined and the granules are dried at a temperature of 70° C under nitrogen.

The apparent density and particles diameter of the dried product are listed in Table 2.

TABLE 2

| Example No. | solvent methanol/water (wt. %) | polymer concentration (wt. %)* | dry matter (wt. %)** | apparent density (g/l) | particle size distribution (wt. %) diameter | |
|---|---|---|---|---|---|---|
| | | | | | >0.4 mm | <0.2 mm |
| 15 | 85/15 | 10 | 45 | 350 | 75 | 11 |
| 16 | 85/15 | 15 | 44 | 370 | 81 | 6 |
| 17 | 85/15 | 20 | 48 | 360 | 82 | 5 |
| 18 | 90/10 | 10 | 49 | 360 | 79 | 4 |
| 19 | 90/10 | 20 | 51 | 390 | 85 | 7 |

*in the solution
**after centrifugation

COMPARATIVE EXAMPLE:

10 Parts of a copolymer of 98% trioxane and 2% ethylene oxide having a melt index $i_2$ (MFI 190/2) of 25 g/min are mixed with 100 parts of a mixture of 60% methanol, 39.9% water and 0.1% triethylamine, and the polymer is dissolved by heating the suspension obtained for 5 minutes at 160° C. The solution is cooled to 135° C and mixed in an autoclave with 30 parts of a mixture of 60% methanol and 40% water which is turbulently stirred and has a temperature of 125° C. With a sintering temperature of the polymer of 127° C the temperature of the precipitating agent is thus 2° C below the sintering temperature. After an average residence time in the autoclave of 15 minutes the precipitated granular polymer is discharged from the bottom of the autoclave and separated from the precipitation agent by suction filtration. Separation by centrifugation is not possible because of the high proportion of fine particles. The solid product has a content of dry matter of about 33%. After drying at a temperature of 70° C under nitrogen 80% of the polymer particles have a diameter of less then 0.2 mm and 5% have a diameter of more than 0.4 mm. The product has an apparent density of 270 g/l.

What is claimed is:

1. A process for making a granular oxymethylene copolymer (POM) containing, in addition to oxymethylene units, from 0.1 to 20% by weight of oxyalkylene units having from 2 to 8 adjacent carbon atoms in the main chain thereof, which process comprises preparing a solution or fine dispersion of POM in a methanol/water mixture at a temperature of 5° to 65° C. above the sintering temperature ($T_s$) of the POM, preparing a cooling agent which is a suspension of 1 to 25% by weight POM in 99 to 75% by weight of a methanol/water mixture at a temperature below $T_s$, cooling said POM solution or fine dispersion in a first stage by mixing it with said cooling agent in such proportions as to produce a blend having a temperature of 0° to 10° C. above $T_s$, thereafter cooling said blend in a second stage to a temperature of 1° to 10° C. below $T_s$, separating the granular POM from the blend and drying it.

2. The process of claim 1, wherein a 3 to 35% by weight solution or dispersion of POM is used as starting material.

3. The process of claim 1, wherein a mixture of 95 to 40% by weight of methanol and 5 to 60% by weight of water, containing a compound having a basic reaction, is used as solvent or dispersion agent.

4. The process of claim 1, wherein the solvent or dispersion agent is a methanol/water mixture containing more than 95% by weight methanol.

5. The process of claim 1, wherein the solution or dispersion of POM is cooled in two stages by mixing it with a turbulent flowing liquid cooling agent.

6. The process of claim 1, wherein the solution or dispersion of POM is cooled in two stages in cooling devices.

7. The process of claim 1, wherein the solution or dispersion of POM is cooled in the first stage by mixing with a turbulent flowing agent and in the second stage by using a cooling device.

8. The process of claim 1, wherein the POM of the suspension is suspended in a mixture of from 95 to 40% by weight of methanol and 5 to 60% by weight of water.

9. The process of claim 1, wherein the POM of the suspension is suspended in a methanol/water mixture containing more than 95% by weight methanol.

10. The process of claim 5, wherein the cooling liquid has a temperature at most 2° C below the sintering temperature of POM.

11. The process of claim 1, wherein in the first cooling stage the solution or dispersion of POM is maintained at a temperature of from 0° to 10° C above the sintering temperature of POM for a period of time of from 0.5 to 5 seconds.

12. The process of claim 5, wherein the proportion by volume of the POM solution or dispersion to the portion of cooling liquid in the first stage is in the range of from 1:2 to 1:35.

13. Granular polyoxymethylene prepared by the process of claim 1.

14. Granular polyoxymethylene as claimed in claim 13 having an apparent density over 300 g/l.

* * * * *